United States Patent [19]
Mossberg

[11] 3,905,770
[45] Sept. 16, 1975

[54] APPARATUS FOR USE IN DETERMINATION OF NITROGEN BY THE KJELDAHL METHOD

[75] Inventor: Leif Roger Mossberg, Asmundtorp, Sweden

[73] Assignee: Tecator Instrument AB, Helsingborg, Sweden

[22] Filed: Sept. 7, 1973

[21] Appl. No.: 395,141

[30] Foreign Application Priority Data
Sept. 15, 1972 Sweden.............................. 11920/72

[52] U.S. Cl.................. 23/253 R; 23/259; 222/442
[51] Int. Cl. .......................................... G01n 31/00
[58] Field of Search.................. 23/259, 292, 253 R; 134/22 C, 37; 222/148, 149, 373, 442; 137/238, 239, 241

[56] References Cited
UNITED STATES PATENTS

| | | | |
|---|---|---|---|
| 2,565,045 | 8/1951 | Ray.................................. | 222/442 X |
| 2,815,289 | 12/1957 | Murray.............................. | 134/22 C |
| 2,835,419 | 5/1958 | Kolk................................... | 222/442 |
| 3,174,829 | 3/1965 | Stokstad........................... | 23/253 R |
| 3,359,062 | 12/1967 | Palm.................................. | 222/148 |
| 3,450,388 | 6/1969 | Stump........................... | 23/252 R X |

OTHER PUBLICATIONS

*Quantitative Clinical Chemistry*, Vol. II, Williams & Wilkins Co., Baltimore, Md., pp. 530–532, (1965).
*Chem. Abstr.*, v. 33:500[5], (1939).
*Chem. Abstr.*, v. 26:4210, (1932).

Primary Examiner—Morris O. Wolk
Assistant Examiner—Timothy W. Hagan
Attorney, Agent, or Firm—Bucknam and Archer

[57] ABSTRACT

Dosing apparatus for use in determining nitrogen according to Kjeldahl, designed for alkalization and steam distillation of acid digest, comprising an alkali storage container connected to an alkali dosing container, and a source for supplying steam, said steam supply source being connected to the dosing container so that the steam fed to the alkalized digest passes through the dosing container.

4 Claims, 2 Drawing Figures

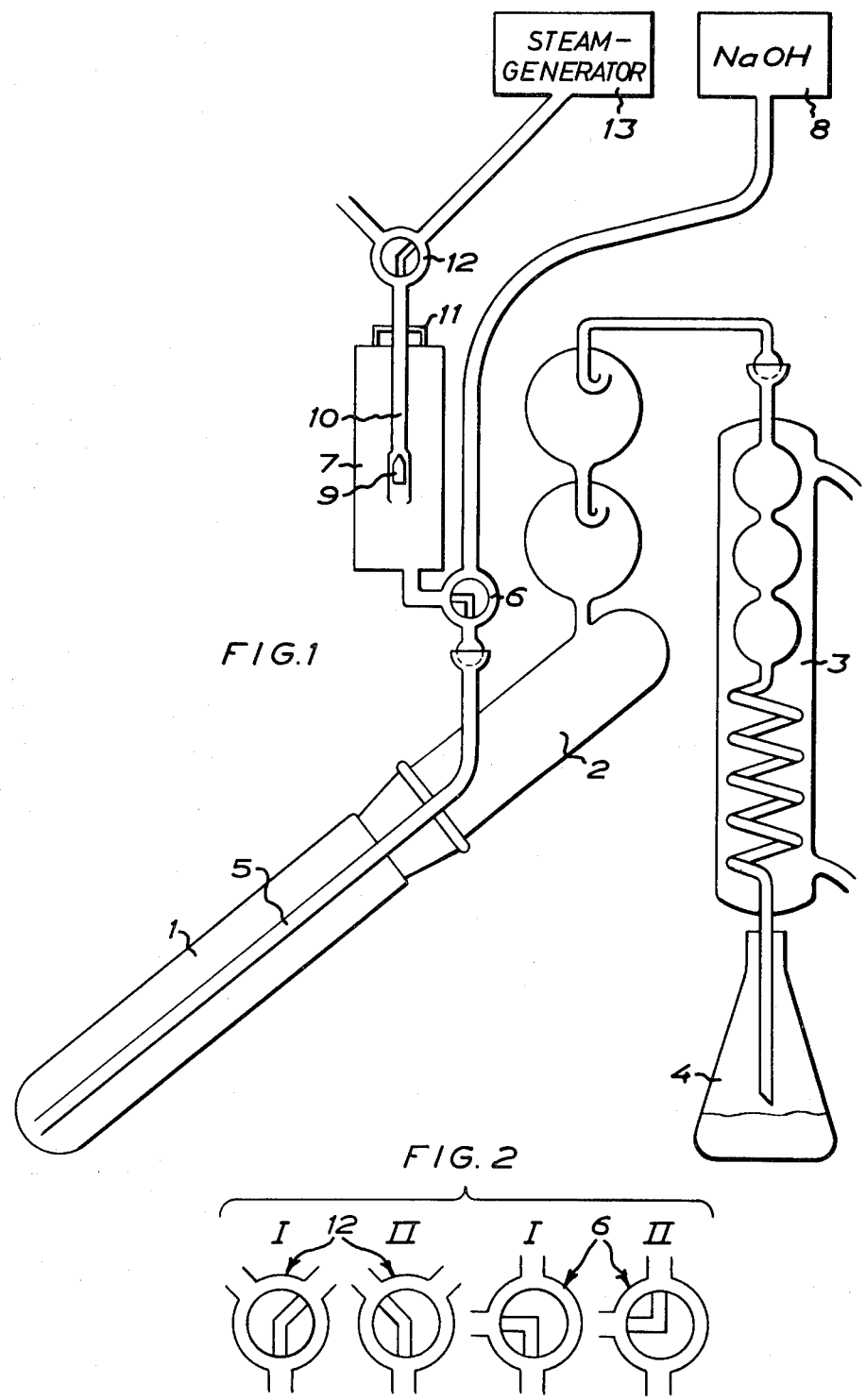

APPARATUS FOR USE IN DETERMINATION OF NITROGEN BY THE KJELDAHL METHOD

The present invention relates to a dosing apparatus for use in determining nitrogen according to Kjeldahl and, more particularly, to an apparatus for alkalizing acid digest resulting from acid digestion and for removing resulting ammonia by means of steam distillation.

Within the field of chemical equipment various devices for measuring and dosing of liquids are already known, such as, for example, those according to Swedish Pat. Nos. 221,373 and 324,468 and U.S. Pat. No. 2,434,723. The apparatus according to the present invention relates to an apparatus of that type, but, in addition, it includes special features characteristic of its specific use.

As has been indicated above, the present apparatus is intended for use in determining nitrogen according to the Kjeldahl method. The Kjeldahl method, which actually includes a series of different methods, concerns the determination of the nitrogen content in organic protein material, and, briefly, it is carried out by reacting or digesting the sample with sulphuric acid in the presence of a catalyst, the organic material in the sample being converted to carbon dioxide and water, and the nitrogen forming ammonia. The ammonia is present as ammonium sulphate in the sulphuric acid digest and in order to liberate the ammonia, a strong alkali, usually sodium hydroxide, is added to the acid digest which is then heated so that the ammonia is evaporated and can be collected in another vessel with a known amount of acid, whereby the amount of ammonia can be determined by titration. Adding sodium hydroxide solution automatically or semi-automatically has proved to involve a troublesome procedure since sodium hydroxide crystallizes very easily, thereby causing mobile parts, such as taps and the like, to seize up.

The apparatus according to the invention is intended for the last step, i.e. that of adding sodium hydroxide to the digest and supplying steam to the digest in order to heat it and to remove ammonia by distillation. To eliminate the problem of the crystallization of sodium hydroxide, the apparatus according to the invention is so designed that the dosing apparatus after every dosage of sodium hydroxide is automatically cleaned by steam which is also used for heating the digest and distilling off ammonia. Furthermore, the apparatus of the invention gives more reliable analysis results since the addition of alkali takes place in a closed system which eliminates the risk of losing ammonia.

The invention thus relates to a dosing apparatus for use in determining nitrogen according to the Kjeldahl method, designed for alkalizing an acid digest resulting from acid digestion and for removing resulting ammonia by means of steam distillation, said apparatus comprising (a) a storage container for alkali connected by a 3-way valve to a dosing container for measuring and dosing alkali and for discharging it through a discharge conduit and (b) a source for supplying steam, wherein said steam supply source is connected by a 3-way valve to said dosing container provided with a float valve, and wherein said discharge conduit also serves as a conduit for steam fed from the steam supply source through the dosing container.

A preferred embodiment of the apparatus of the invention will be more fully described hereinbelow with reference to the accompanying drawing, in which:

FIG. 1 is a schematic side elevation of the invention, and

FIG. 2 illustrates the different positions of the valves 6 and 12.

FIG. 1 shows a distillation vessel 1 connected to an expansion chamber 2. The chamber 2 communicates with a receiver 4 via a condenser 3. A tube 5 introduced into said distillation vessel 1 is connected to a dosing container 7 by way of the 3-way valve 6 (position I). Said 3-way valve 6 is adjustable for establishing communication between the dosing container 7 and an alkali storage container 8 (position II). A float valve 9 and a level tube 10 are mounted in the dosing container, which tube extends through a slide coupling 11 in the upper portion of said dosing container and is connected to a second 3-way valve 12. This 3-way valve is connected, on one hand, to a pipe communicating with the environment (position II) and, on the other hand, to a steam supply source 13 (position I).

The operation of the apparatus is briefly as follows.

A sodium hydroxide solution is to be added to an acid digest in the distillation vessel 1 and heating by steam is to be performed in order to remove ammonia by distillation. For this purpose the valves 12 and 6 are brought into position II. Sodium hydroxide solution will thereby run from the storage container mounted above the dosing container and fill said dosing container 7 to a level which is determined by the position of the float valve 9. When the liquid reaches the float valve 9 the float valve will seal the orifice of the level tube 10 and the overpressure subsequently generated in the dosing container will make the flow of sodium hydroxide solution cease. The amount of sodium hydroxide solution supplied to said dosing container 7 can be controlled by displacing the level tube 10 in the slide coupling 11. After a predetermined volume of sodium hydroxide solution has been received in the dosing container 7, the valve 6 is brought into position I and the measured quantity of liquid is discharged into the distillation vessel 1. As soon as said dosing container is emptied, the valve 12 is brought into position I. Steam will thereby be fed from the steam supply source 13 through said valve 12, past the float valve 9 and into said dosing container 7. The sodium hydroxide solution will thus be removed from said container and particularly from said float valve, the function of which will thereby be secured before the subsequent refilling of the dosing container. The steam then passes through the valve 6 and the tube 5 down into the distillation vessel 1, whereby ammonia is distilled off the solution in the distillation vessel and is collected in the receiver 4 after condensation in the condenser 3.

When the distillation is to be interrupted, the valve 12 is brought into position II for airing. The valve 6 is then brought into position II whereby the dosing container 7 is refilled with sodium hydroxide solution. At the same time the distillation vessel 1 is replaced by a new vessel containing a sample to be distilled, and the receiver 4 is replaced by a new receiver.

The embodiment shown in FIG. 1 comprising an expansion chamber 2 makes it possible to use a distillation vessel 1 of considerably smaller size than would otherwise be the case. This is a great advantage since the same vessel may preferably be used for digestion as well as distillation and, thus, the digestion can be performed in a relatively small vessel.

The invention has been described above with reference to a particularly preferred embodiment, but it is obvious that it is not limited to this embodiment but can be modified within the scope of the following claim.

What I claim and desire to secure by Letters Patent is:

1. An apparatus for use in determining nitrogen according to the Kjeldahl method, designed for alkalizing an acid digest resulting from acid digestion and for removing resulting ammonia by means of steam distillation, said apparatus comprising a distillation vessel containing said acid digest, a condenser and a receiver connected with said distillation vessel, an alkali storage container, a dosing container for alkali adapted for dosing and measuring alkali and for discharging alkali from said storage container into said distillation vessel, a first 3-way valve allowing flow of alkali from said dosing container to said distillation vessel when set in a first position and adapted for establishing communication between said alkali storage container and said dosing container when set in a second position, a supply of steam, means for connecting said steam to said distillation vessel and said dosing container, a second 3-way valve communicating said steam to said dosing container when set in a first position and communicating with the atmosphere when set in a second position and a float valve within said dosing container for controlling the level of alkali into said dosing container.

2. The apparatus according to claim 1 comprising a tube within said distillation vessel, said tube being connected to said first 3-way valve.

3. The apparatus according to claim 2 comprising a leveling tube in said dosing container, said tube being connected to said second 3-way valve.

4. The apparatus according to claim 1 comprising an expansion chamber between said distillation vessel and said condenser.

* * * * *